April 2, 1946.   J. QUINN ET AL   2,397,806
ELECTRODE STEM CLAMP
Filed Sept. 18, 1942   2 Sheets-Sheet 1
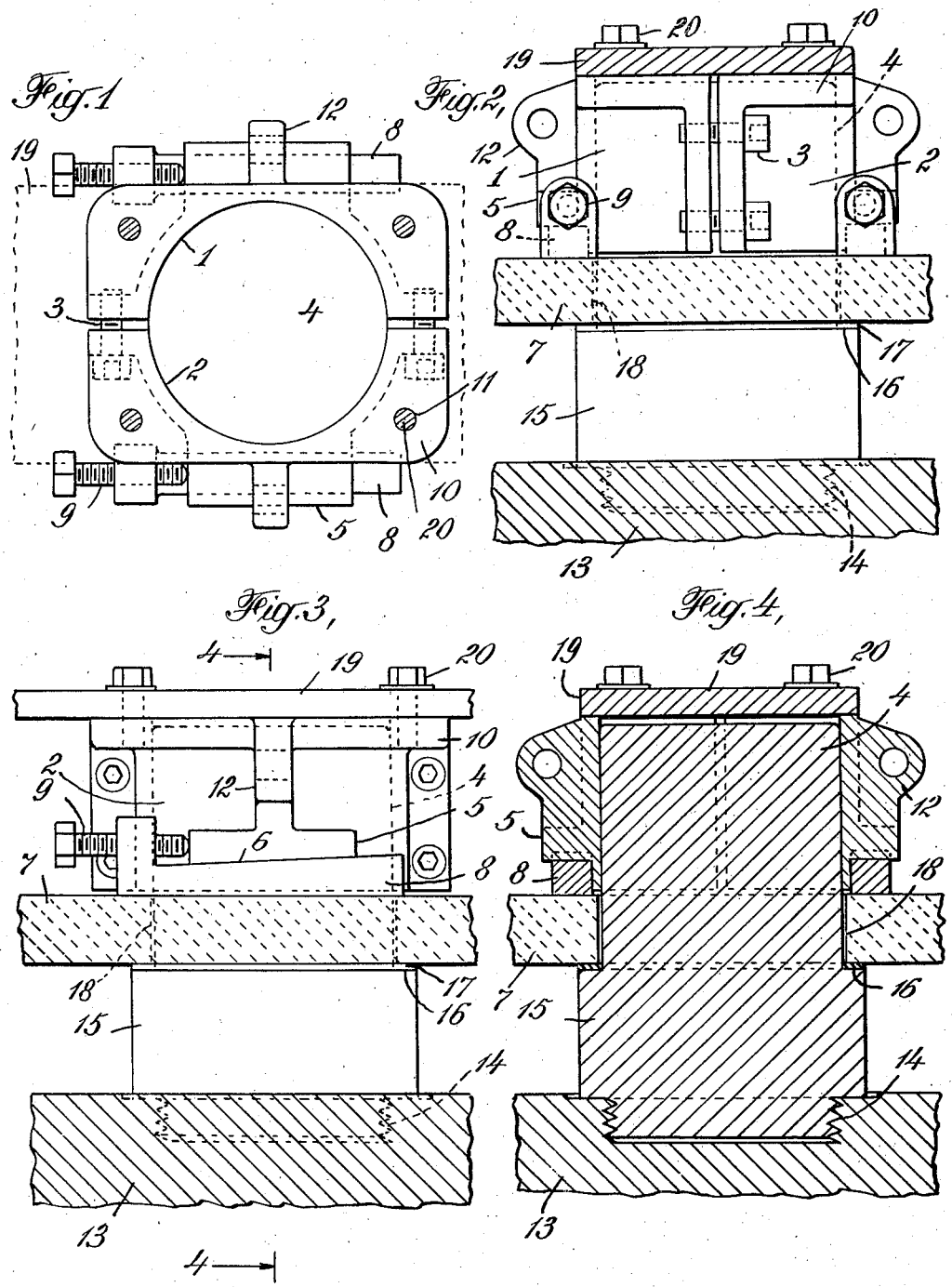
INVENTORS
John Quinn
Roy A. Horst
BY
ATTORNEY April 2, 1946.    J. QUINN ET AL    2,397,806
ELECTRODE STEM CLAMP
Filed Sept. 18, 1942    2 Sheets-Sheet 2
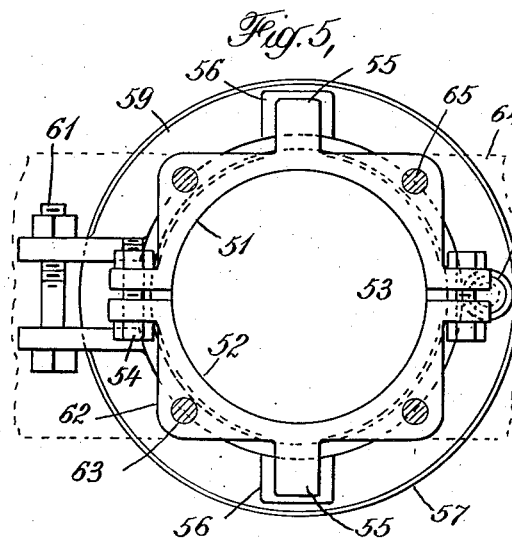
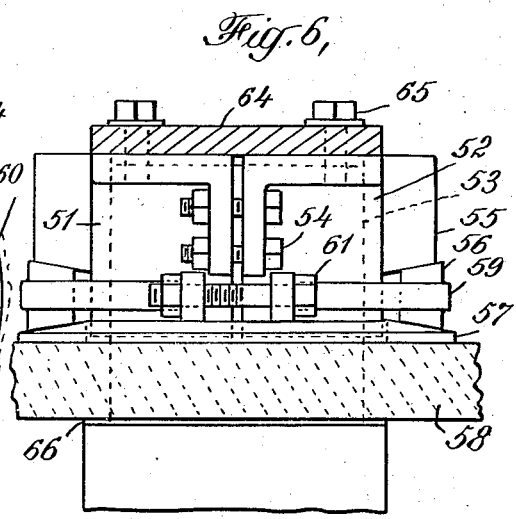
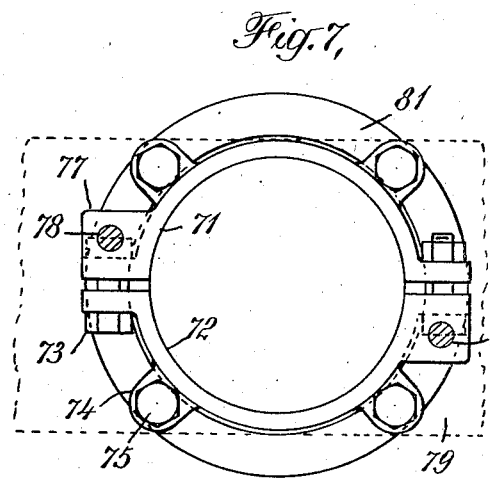
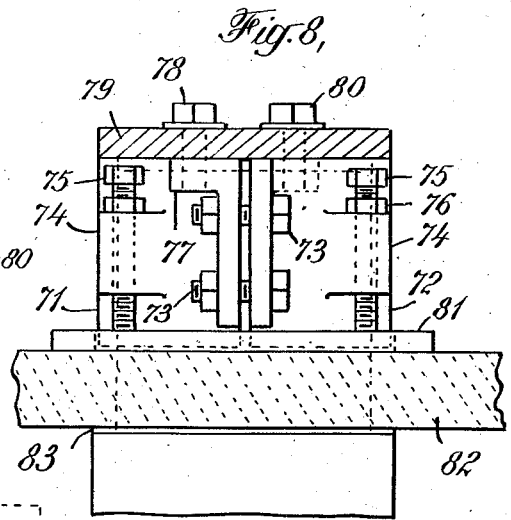
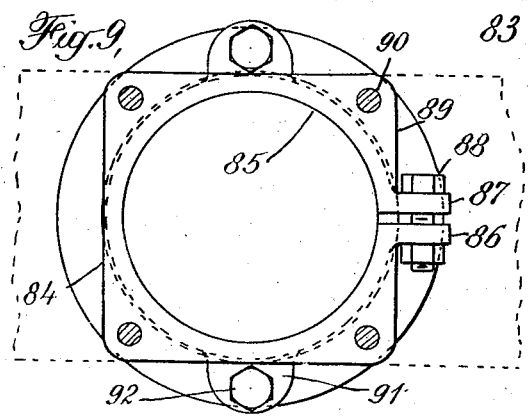
INVENTORS
John Quinn
Ray A. Horst
BY
ATTORNEY Patented Apr. 2, 1946

2,397,806

UNITED STATES PATENT OFFICE 2,397,806

ELECTRODE STEM CLAMP

John Quinn and Roy A. Horst, Syracuse, N. Y., assignors to The Solvay Process Company, New York, N. Y., a corporation of New York Application September 18, 1942, Serial No. 458,846

9 Claims. (Cl. 204—297)

This invention relates to improvements in electrolytic cells and is particularly concerned with novel supporting means for electrodes, such as the carbon anodes employed in electrolytic cells.

The carbon anodes of cells such as mercury cathode electrolytic cells usually comprise horizontally disposed carbon blocks. In the past these blocks have been supported by ledges at the ends of the anodes or have been suspended from the cell cover by means of carbon stems secured to the blocks. The latter construction has the advantage that it provides a means of electrical contact as well as a support. However, previous types of construction have been subject to important disadvantages. For example, one former construction involved a threaded anode-supporting stem extending through an aperture in the cover and fixed to the cover by means of a hard rubber nut. Electrical contact was secured by means of copper bars clamped to the stem. Such an assembly is subject to the disadvantage that it is exceedingly difficult to draw the nut tight enough to provide a rigid support for the anode and to seal the aperture against leakage. Moreover, after a few days of operation the nut becomes cemented to the stem by the oil used in impregnating the stem to make it impervious to gas and when it is desired to take off the nut to readjust the stem, for example to compensate for anode wear, it usually is necessary to break the nut and remove it in pieces; unless care is taken to avoid damaging the threaded portion of the carbon stem, the stem is apt to become injured to a degree requiring its replacement.

It is an object of the present invention to provide electrode supporting means which assure adequate support for the electrode, provide a gastight seal, and are at the same time both durable and easily demountable.

Further objects will appear from the following description of the invention.

The supporting structure of the present invention comprises a supporting frame for the electrode, which frame may be the cover of the electrolytic cell. This frame is provided with an aperture through which the electrode stem passes. The electrode stem is provided with a shoulder, which bears against the inner surface of the frame while outside the frame the electrode stem embracing elements are disposed in such a manner as to securely grasp the electrode stem near the outer surface of the frame. The stem embracing elements are provided with wedge-bearing surfaces which mate with wedge means bearing against the outer face of the frame.

It should be appreciated that where reference is made herein to parts bearing against the frame, it is not necessary that such parts bear directly against the frame. Thus the stem shoulder normally is separated from the frame by a sealing gasket, and the wedge means may be separated from the frame by a bearing plate or annulus to distribute the pressure exerted by the wedge means.

In order to provide a more complete understanding of our invention, there follow descriptions of several practical specific embodiments thereof. These descriptions should be considered in connection with the accompanying drawings wherein Fig. 1 is a plan view of a preferred clamp assembly of the invention;

Fig. 2 is a side elevation thereof showing the clamp in position upon an electrode stem;

Fig. 3 is a front elevation of the same assembly;

Fig. 4 is a section on line 4—4 of Fig. 3;

Fig. 5 shows a plan view of an alternative clamp assembly within the purview of the invention;

Fig. 6 is a side elevation of the device shown in Fig. 5;

Fig. 7 is a plan view showing a third embodiment of the invention;

Fig. 8 is a side elevation thereof; and

Fig. 9 is a plan view of a fourth embodiment of the invention.

With particular reference to Figs. 1 to 4, the clamp illustrated comprises a pair of electrode stem embracing elements 1 and 2 secured to each other by bolts 3 which may be screwed into tapped apertures in the element 1 as shown. If it is desired to use through bolts these apertures need not be threaded. In this manner the two electrode stem embracing elements securely grasp the stem 4 of the electrode, as best shown in Fig. 4. Each of elements 1 and 2 is provided with a lug 5 which has a wedge-bearing surface 6 inclined slightly to the plane of the electrode supporting frame 7. Between each lug 5 and the surface of the anode supporting frame 7 are wedge means 8 comprising a wedge portion and a tightening or holding screw 9 threaded into the wedge portion. Each of elements 1 and 2 is also provided with a horizontal bus bar rest plate 10, having threaded apertures 11, and with a lifting ear 12.

As shown in Figs. 2, 3, and 4, anode 13, shown fragmentarily, is fixed to the electrode stem 4 by a threaded joint 14. The electrode supporting stem 4 has an enlarged section 15 which provides a shoulder 16 for bearing against the cover or frame 7. Inserted between the shoulder 16 and cover 7 is a sealing gasket 17.

To mount an anode by means of the illustrated clamp, the anode is first secured to the anode supporting stem by the threaded joint. The anode stem carrying gasket 17 is then protruded through aperture 18 of cover 7 and stem embracing elements 1 and 2 are securely bolted to the portion of the stem 4 protruding on the upper side of the cover. Wedge means 8 are then placed in position as illustrated and the bolts 9 are turned to force lugs 5 upward away from cover 7 and thus to compress gasket 17 between shoulder 16 and the underside of the cover. By this means an extremely tight and gas-proof union is made between the anode stem and the cover 7. If the plane of shoulder 16 is parallel to the anode 13, the clamp will hold the anode 13 rigidly parallel to the cover 7.

Normally an electrolytic cell may comprise a number of anodes each secured to the cell cover in the aforementioned manner. On a large cell the cover is a heavy element and requires suitable hoisting means for its manipulation. Ears 12 provide one highly satisfactory means for securing grappling hooks to the cell cover for hoisting it into position. Other lifting means with bars to fit under flanges like bus bar rest plate 10 have been found satisfactory.

In order to secure electrical connection to the electrode, a bus bar 19, whose location is merely indicated by broken lines in Fig. 1, may be rested upon the plates 10 and bolted securely thereto by means of bolts 20 which pass through threaded apertures 11. Since a very large surface area of elements 1 and 2 is presented to the electrode stem and since a high degree of compression is secured by means of bolts 3, the electrical resistance of the connection is exceedingly low.

We have found that a suitable material for construction of the clamp described above is a zinc alloy containing 4% aluminum, .04% magnesium, and the balance zinc, die-cast in the required shape and drilled and threaded to provide the desired threaded and unthreaded apertures. Cast manganese bronze has also been found to be a good construction material. Ordinary steel bolts may be used for securing the several parts in their operative relation.

In the embodiment illustrated in Figs. 5 and 6, a pair of stem embracing elements 51 and 52 embrace the electrode supporting stem 53 and are rigidly secured thereto by means of nuts and bolts 54. Each of the electrode embracing elements bears a wedge-bearing lug 55 mated with a wedge 56. In the embodiment shown, a wedge opposing annulus 57 has been provided for distributing the stress more uniformly over electrode supporting cover 58. Each wedge 56 is mounted on a semi-circular actuating member 59. The two members 59 are secured by a pin 60, which serves as a hinge, and a nut and bolt 61. The electrode stem embracing elements 51 and 52 are provided with bus bar bearing plates 62 having threaded apertures 63 in the same manner as the elements 1 and 2 of Fig. 1 and these may be used to secure a bus bar 64 by means of securing bolts 65.

The clamp is operated in a manner similar to that of the clamp shown in Figs. 1 to 4. The anode supporting stem carrying a gasket 66 is extended through an aperture in the supporting cover 58, wedge resisting ring 57 is placed upon the protruding portion of the electrode stem, and embracing elements 51 and 52 are secured thereto by means of nuts and bolts 54. The wedges and wedge actuating elements 56 and 59 are then placed about the stem between lugs 55 and ring 57 and drawn tight by means of nut and bolt 61 which serve to compress the cover 58 and gasket 66 between the ring 57 and the shoulder of the electrode supporting stem. The provision of a single tightening bolt to simultaneously actuate both wedges in the manner shown assures uniform distribution of strain and reduces the chance of breaking the stem by uneven tension at opposite sides.

The embodiment illustrated in Figs. 7 and 8 comprises a pair of electrode embracing elements 71 and 72 secured to the electrode stem by nuts and bolts 73. Each of the elements 71 and 72 is provided with a pair of lugs 74 threaded vertically to receive screws 75, which, if desired, may be provided with lock nuts 76, as shown. The threads of lugs 74 serve as wedge bearing surfaces and the threads of screws 75 as wedges. Each of elements 71 and 72 also is provided with a lug 77 having a threaded aperture 78 to which bus bar 79 may be secured by means of a bolt 80. A pressure distributing ring 81 is provided to distribute the compression stress uniformly along the electrode supporting cover 82.

Application of this embodiment of the invention is essentially similar to that of the previous embodiment. The electrode supporting stem to which the sealing gasket 83 has been applied is projected through an aperture in the supporting cover 82. Ring 81 is placed thereon and stem embracing elements 71 and 72 are secured to the protruding portion of the stem. Screws 75 are then turned to secure the desired compression of gasket 83 and locked into position by means of lock nut 76.

It has been found that the embodiment shown in Figs. 7 and 8 can be used successfully with only one pair of set screws corresponding to 75 of the drawing placed at opposite ends of a diameter of the anode stem aperture and bearing on plates corresponding to the ring 81.

Fig. 9 illustrates a stem clamp embodying the same principle as the clamp shown in Figs. 7 and 8 but involving the use of only a single clamping element. In Fig. 9, 84 represents a single-piece electrode stem clamping element having an aperture 85 slightly larger than the electrode stem to be clamped. The aperture 85 is made to clasp the electrode stem by drawing together ears 86 and 87 of the element by tightening nut and bolt 88. Bus bar rest plate 89 has holes 90 therein for securely fastening the anode bus bar to the element. Lugs 91 are drilled vertically and threaded so that set screws 92 may be tightened to produce the desired gas-tight joint between the anode and cover plate in the manner described in connection with Figs. 7 and 8.

It will be observed that in the embodiments of Figs. 5 and 6 and 7 and 8 the two stem embracing elements are in each case identical. In Fig. 1 the elements are identical except for the fact that one of the elements is provided with threaded apertures for bolts 3 and the other is provided with unthreaded apertures. Since drilling and threading is accomplished after the elements have been cast, only a single die is required in each case for casting these elements.

We claim:

1. An electrode support comprising a rigid electrode supporting frame having an electrode stem aperture, an electrode supporting stem extending through said aperture and having a shoulder bearing against one side of said frame, an electrode stem clamp securely embracing said stem on the other side of said frame and provided with bearing surfaces, and wedge means mating with said bearing surfaces and bearing against said other side of said frame.

2. An electrode support comprising a rigid electrode supporting frame having an electrode stem aperture, an electrode supporting stem extending through said aperture and having a shoulder bearing against one side of said frame, an electrode stem clamp securely embracing said stem on the other side of said frame and provided with wedge bearing surfaces facing said frame, a wedge mating with said wedge bearing surfaces and bearing against said other side of said frame, and tightening means adapted to secure said wedge in wedging relation between said frame and said wedge bearing surfaces.

3. An electrode support comprising a rigid electrode supporting frame having an electrode stem aperture, an electrode supporting stem extending through said aperture and having a shoulder bearing against one side of said frame, an electrode stem clamp comprising at least two elements securely embracing said stem on the other side of said frame and provided with wedge bearing surfaces facing said frame, a wedge mating with said wedge bearing surfaces and bearing against said other side of said frame, and tightening means adapted to secure said wedge in wedging relation between said frame and said wedge bearing surfaces.

4. An electrode support comprising a rigid electrode supporting frame having an electrode stem aperture, an electrode supporting stem extending through said aperture and having a shoulder bearing against one side of said frame, an electrode stem clamp comprising a pair of electrode stem embracing elements fastened to each other so as to grasp securely between them said stem on the other side of said frame, each of said elements being provided with wedge-bearing surfaces slightly inclined with respect to said frame, a pair of wedges mating with said wedge bearing surfaces, and screw means for actuating said wedges and adapted to hold said wedges in wedging relation between said frame and said wedge bearing surfaces.

5. In an electrolytic cell, an improved cover and electrode assembly comprising a rigid horizontal cover having electrode stem apertures therein, electrode stems of substantially the same cross section as said apertures extending through said apertures and having enlarged portions providing shoulders bearing against the under face of said cover, sealing gaskets separating said shoulders from said cover, electrode stem clamps each fastened so as to grasp securely an electrode stem above said cover, each of said clamps being provided with bearing surfaces, and wedge means mating with said bearing surfaces and bearing against the upper face of said cover.

6. In an electrolytic cell, an improved cover and electrode assembly comprising a rigid horizontal cover having circular electrode stem apertures therein, cylindrical electrode stems of about the same diameter as said apertures extending through said apertures and having enlarged portions providing shoulders bearing against the under face of said cover, sealing gaskets separating said shoulders from said cover, electrode stem clamps each comprising a pair of electrode stem embracing elements provided with substantially cylindrical grasping faces bolted to one another so as to grasp securely between them an electrode stem above said cover, each of said elements being provided with bearing surfaces, and wedge means mating with said bearing surfaces and bearing against the upper face of said cover.

7. In an electrolytic cell, an improved cover and electrode assembly comprising a rigid horizontal cover having circular electrode stem apertures therein, cylindrical electrode stems of about the same diameter as said apertures extending through said apertures and having enlarged portions providing shoulders bearing against the under face of said cover, sealing gaskets separating said shoulders from said cover, electrode stem clamps each comprising a pair of electrode stem embracing elements provided with substantially cylindrical grasping faces fastened to each other so as to grasp securely between them an electrode stem above said cover, each of said elements being provided with bearing surfaces, a pair of wedges mating with said bearing surfaces, and screw means for actuating said wedges and adapted to hold said wedges in wedging relation between said bearing surfaces and the upper face of said cover.

8. In an electrolytic cell, an improved cover and electrode assembly comprising a rigid horizontal cover having electrode stem apertures therein, electrode stems of substantially the same cross section as said apertures extending through said apertures and having enlarged portions providing shoulders bearing against the under face of said cover, sealing gaskets separating said shoulders from said cover, electrode stem clamps each comprising a pair of electrode stem embracing elements provided with grasping faces to match the electrode stems fastened to each other so as to grasp securely between them an electrode stem above said cover, each of said elements being provided with bearing surfaces, a pair of wedges mating with said bearing surfaces, and screw means for actuating said wedges and adapted to hold said wedges in wedging relation between said bearing surfaces and said pressure distributing ring.

9. In an electrolytic cell, an improved cover and electrode assembly comprising a rigid horizontal cover having circular electrode stem apertures therein, cylindrical electrode stems of about the same diameter as said apertures extending through said apertures and having enlarged portions providing shoulders bearing against the under face of said cover, sealing gaskets separating said shoulders from said cover, electrode stem clamps each comprising a pair of electrode stem embracing elements composed of electrically conductive material and provided with substantially cylindrical grasping faces bolted to one another so as to grasp securely between them an electrode stem above said cover, each of said elements being provided with bearing surfaces, a pair of wedges mating with said bearing surfaces, screw means for actuating said wedges and adapted to hold said wedges in wedging relation between said bearing surfaces and the upper face of said cover, and means for electrically connecting said stem embracing elements with an electric current source.

JOHN QUINN.
ROY A. HORST.